INVENTORS
Leon Heidmann
Pierre Letrilliart
By Shoemaker + Mattare
ATTORNEYS

Patented Apr. 27, 1954

2,677,083

UNITED STATES PATENT OFFICE 2,677,083

MOTOR CONTROL CIRCUIT WITH A FREQUENCY CONVERTER

Leon Heidmann, Paris, and Pierre Letrilliart, Jeumont, France, assignors to Forges et Ateliers de Constructions Electriques de Jeumont, Paris, France, a French body corporate Application November 29, 1949, Serial No. 129,996

Claims priority, application France December 7, 1948

5 Claims. (Cl. 318—91)

The present invention relates to frequency convertor sets or groups similar to those described in the U. S. Patent No. 2,585,392, issued February 12, 1952.

The invention has for one object to facilitate the control and increase the speed-range of motors supplied by sets of this type. Another object is to provide simple means of small bulk for controlling the driving motor and the output frequency of the frequency changer, while using the same starting rheostat for the transitions between the various economical speeds of the driving motor, whereby the control equipment is considerably simplified. Another object of the invention is to effect the stopping of the main rotor of the frequency changer under particularly advantageous conditions which will be explained hereinafter.

The invention also aims at increasing the number of economical speeds of the motors (i. e. speeds with resistances cut out) and ensuring the continuity of the driving torque during the transitions from one speed to another, where the motors to be supplied with variable-frequency current are traction motors, for example.

Figure 1:
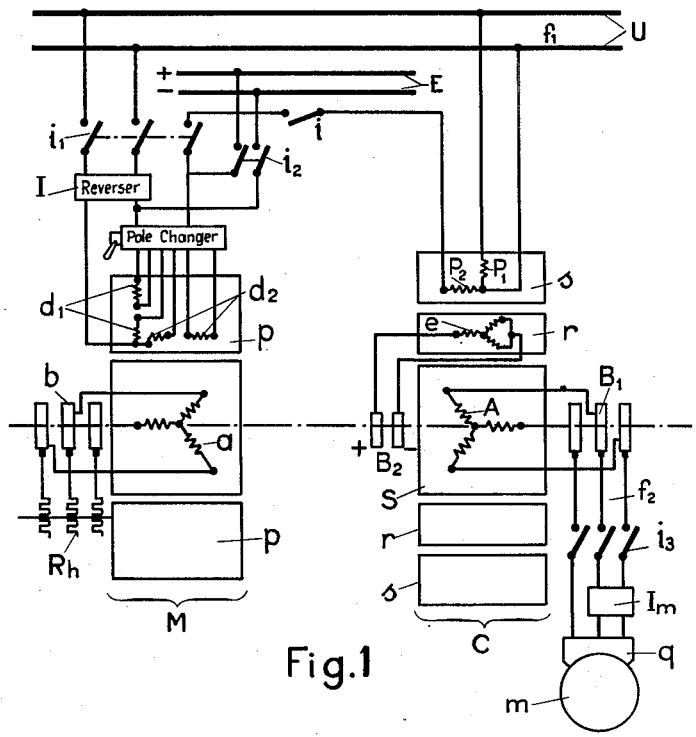
Figure 3:
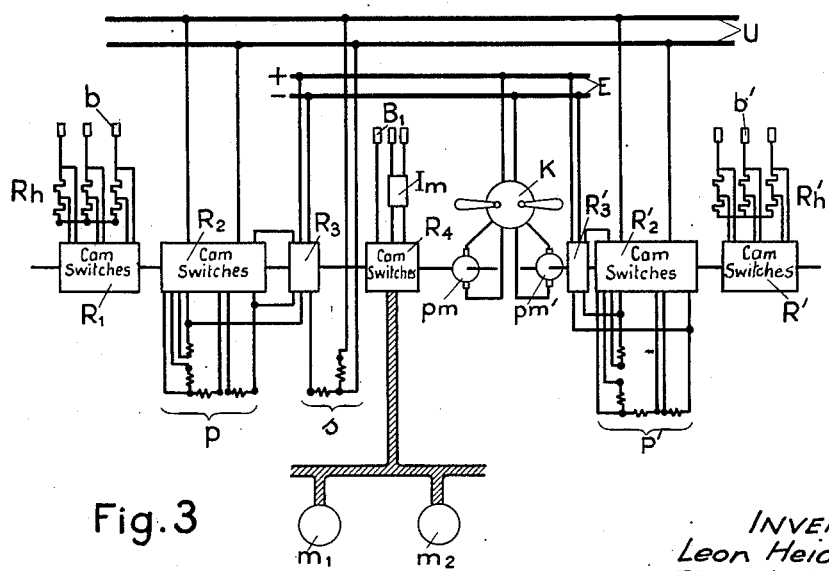
Figure 2:
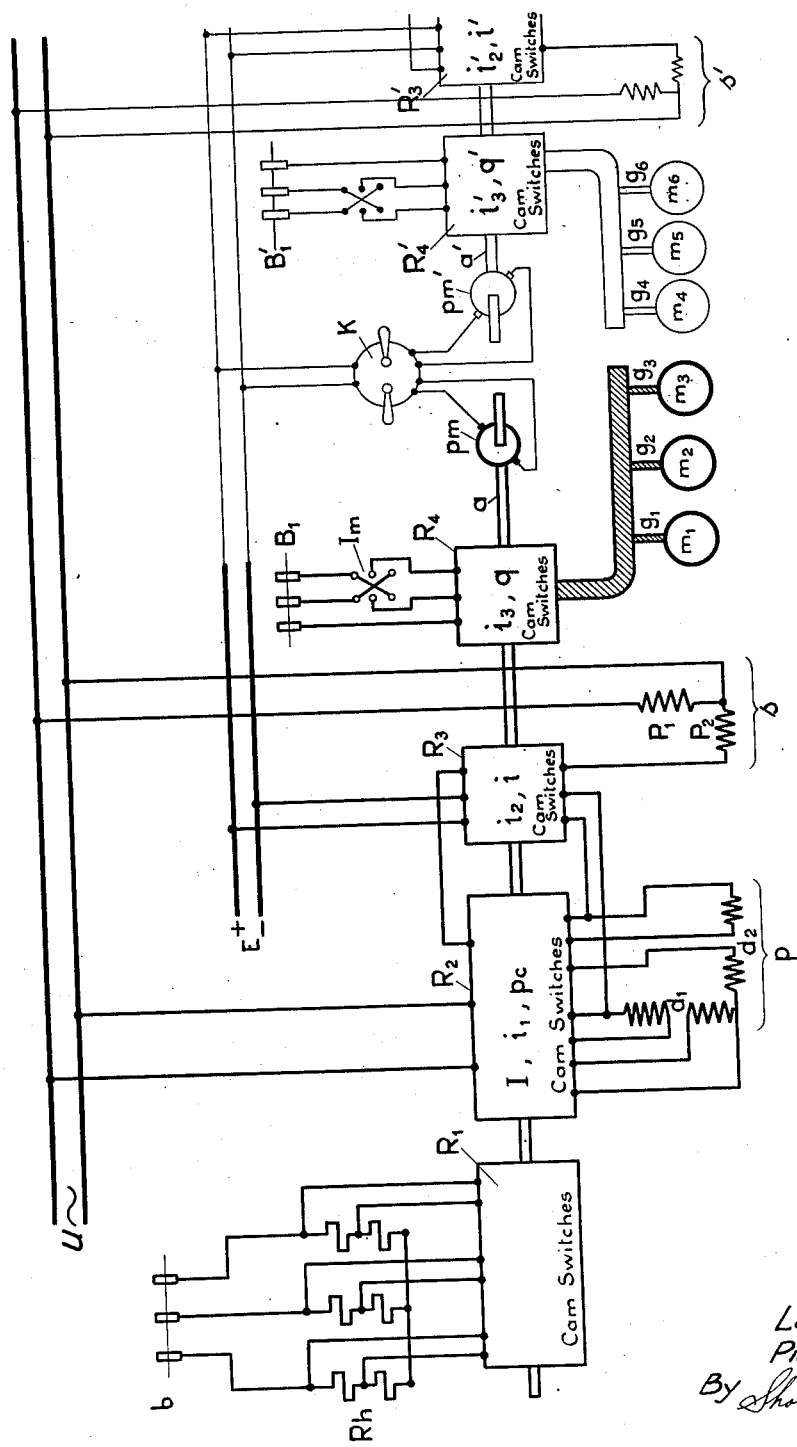

The invention is hereinafter described with reference to the accompanying drawings, wherein Fig. 1 is a simplified diagram of electrical connections, and Fig. 2 shows the arrangement and grouping of cam-operated contactors and their connections to form a controller operated by a pilot-motor for effecting successively all operations of the apparatus shown in Fig. 1. Fig. 3 illustrates the arrangement of a single convertor set with two driving motors.

Referring to Fig. 1, this shows diagrammatically a convertor set comprising an induction-type motor M and a frequency changer C, both connected to a single-phase supply line U. The output rings $B_1$ of the frequency changer C are connected to the load such as one or a plurality of induction-type motors $m$, for example.

The stator or primary $p$ of the driving motor M carries a winding, assumed for example to be a two-phase winding $d_1$, $d_2$, which is provided with a pole changer device for changing the number of poles. The rotor carries a polyphase secondary winding $a$, connected by means of the rings $b$ to an adjustable slip and starting rheostat $R_h$.

The frequency changer C comprises a stator $s$, likewise assumed to be for example of two-phase type, with windings $P_1$, $P_2$, a conventional intermediate rotor $r$ carrying a suitable winding $e$, and a main rotor S with a polyphase winding A connected to the output slip-rings $B_1$. As known, the intermediate rotor $r$ can revolve freely on the shaft of the main rotor. Its winding $e$ is adapted to be excited with direct current by means of the rings $B_2$: it can simultaneously perform in a well-known manner the functions of an exciter winding to produce a rotating field and a damper for the inverse field.

After the said intermediate rotor $r$ has been brought up to speed by means of a suitable starting device, such as an auxiliary motor (not shown), a rotating field and a polyphase voltage are produced in the known manner in the stator $s$; one phase of this voltage is connected to the stator of the motor M by closing the switch $i$. In these conditions the motor M receives a complete supply of two-phase current, enabling it to be started up as usual by means of the rheostat $R_h$.

Analysing the operation of the machine C, it is found that if the main rotor S is driven by the motor M at the speed of the auxiliary rotor $r$, the frequency $f_2$ appearing at the slip-rings $B_1$ is zero; if the speed of the motor M and the main rotor S decreases, the frequency $f_2$ increases, while remaining lower than the single-phase frequency $f_1$ of the supply mains U; if the main rotor S comes to rest, $f_2=f_1$; and if the main rotor S revolves in the opposite direction, $f_2$ becomes greater than $f_1$. By regulating the speed of the driving motor M, it is therefore possible to start and regulate the frequency $f_2$ of the current which is energizing the load motor or motors $m$, which will be assumed to be of the squirrel-cage induction type, for example.

According to the invention, the various speeds of rotation in both directions of the polyphase induction-type wound rotor driving motor of the set or group, including zero speed, are obtained by the combined use of the slip control rheostat $R_h$, the pole-changer for producing different synchronous speeds, and an intermediate connection during which the driving motor is excited by direct current, in order to keep its magnetic field substantially stationary.

These various speeds of the driving motor are graded in such a manner that all the transitions from one speed to another are obtained by means of the same equipment and the same starting and slip rheostat. With this object in view, the intervals between successive speeds are such that each transition corresponds practically to the same increase of power delivered by the convertor.

The advantages and the operation of the invention will be more clearly understood by referring to the following example. It will be assumed that the single-phase voltage U has a frequency $f_1$ of 50-cycles per second, and that the stator $p$ of the motor M can have either four or eight poles, according to the position of the pole-changer, while the stator $s$ of the machine C always has the same number of poles, for instance four.

With the intermediate rotor $r$ started, then synchronized by conventional means (not shown), and the switch $i$ closed, the motor M is first started up, its stator windings $d_1$, $d_2$ being connected so as to operate at full speed with four poles. When the rheostat $R_h$ is short-circuited, the speed of the set is practically 1,500 R. P. M. The main rotor S is revolving in the same direction as the intermediate rotor $r$ and at the same speed, i. e. practically in synchronism with the rotating field of the stator $s$; the output frequency $f_2$ is consequently practically equal to zero.

The motor switch $i_3$ is then closed, but the motor $m$ which has to be energized remains stationary, because the supply frequency $f_2$ is zero. In order to start this motor $m$, the rheostat $R_h$ is re-inserted and the windings $d_1$, $d_2$ of the stator $p$ are reconnected so as to operate with eight poles.

The rotor $a$ of the motor M thus co-operates with a field which is rotating at 750 R. P. M. relatively to it and which induces rotor currents limited by the rheostat $R_h$. Gradual short-circuiting of this rheostat has the effect of bringing the rotor $a$ up to the speed of this rotating field, apart from slip, i. e. substantially up to 750 R. P. M.

In this first period of the starting operation, the machine M operates as an induction generator. The speed of the main rotor S is then half that of the rotating field produced by the stator $s$ and by the intermediate rotor $r$ of the machine C, and the frequency $f_2 = 0.5\ f_1 = 25$ cycles per second. The load motor $m$ finally revolves at a low economical speed equal to 25%, when the resistances have been gradually cut out.

In order to continue the acceleration of the motor $m$, the resistances $R_h$ are re-inserted, the three-pole switch $i_1$ is opened so as to cut off the single-phase current supply, and the switch $i_2$ is immediately closed so as to replace that single-phase supply by direct current excitation, the current being supplied by the direct-current mains E.

The rotor $a$ of the motor M, which is revolving at 750 R. P. M., is thus rotating in a stationary magnetic field. The relative speed of this field in relation to the rotor $a$ is therefore still 750 R. P. M., as in the previous stage, and as before, the gradual short-circuiting of the same rheostat $R_h$ brings the rotor $a$ up to the speed of the field, apart from slip, i. e. brings it substantially to a standstill. Under these conditions, the output frequency $f_2$ is practically equal to $f_1$, that is to say, in the example chosen, 50 cycles per second; the motor $m$ therefore revolves without resistances at an economical speed of 50%.

It should be noted that under these conditions, the set performs a very slow rotary movement; this offers the advantage that the brushes of the machine C which are co-operating with the slip-rings $B_1$, do not remain in contact with the same portions of those rings; consequently, the brushes do not "mark" and there is no danger of their damaging the rings.

In order to further increase the speed of the load motor $m$, the switches $i_1$ and $i_2$ are opened, two leads of the stator $p$ are crossed by means of a conventional reverser I, the eight-pole connection of the stator $p$ is maintained, the resistances $R_h$ are gradually re-inserted and the switch $i_1$ is reclosed. This produces a stator field rotating in the contrary direction at 750 R. P. M. relatively to the almost stationary rotor $a$. This rotor is therefore, with respect to the stator field, still under conditions identical with those of the two previous stages, except that this time, because of the inverse rotation of the field, the torque of the rotor $a$ changes sign and becomes a driving torque.

By a gradual short-circuiting of the same rheostat $R_h$, the rotor S is again brought to the speed of the field, apart from slip, i. e. to about 750 R. P. M., but in the opposite direction to that of the rotating field of the stator $s$, and the frequency $f_2$ becomes equal to 75 cycles per second. The motor $m$ has therefore an economical speed of 75%, without resistances.

The last stage of the acceleration of the load motor $m$ consists in opening the switch $i_1$, throwing the pole-changer so as to cause the stator $p$ to operate with four poles, re-inserting the resistances $R_h$, reclosing the switch $i_1$ again and bringing the motor M up to 1,500 R. P. M. by gradually short-circuiting the rheostat $R_h$: the frequency $f_2$ at the slip-rings $B_1$ then becomes equal to 100 cycles per second, and the speed of the load motor $m$ is 100%.

It can thus be seen that in the above example the arrangement described provides for the five following economical positions operating without resistances:

| Position | Field speed of the stator $p$ (R.P.M.) | Direction of rotation of M and S | Frequency $f_2$ | Synchronous speed of motor $m$ |
|---|---|---|---|---|
| | | | | Percent |
| 1 | 1,500 | Same as $r$ | 0 | 0 |
| 2 | 750 | do | 25 | 25 |
| 3 | 0 | Almost no rotation | 50 | 50 |
| 4 | −750 | Opposite to $r$ | 75 | 75 |
| 5 | −1,500 | do | 100 | 100 |

It can also be seen that the transitions from each of these positions to the next are effected gradually by means of the same rheostat $R_h$. This, as will be understood, provides a very great simplification of the equipment, which is particularly advantageous in the case of electric traction apparatus.

It is preferable to give the contacts of the rheostat $R_h$, the switches $i$, $i_1$, $i_2$, $i_3$, the reverser I and the pole-changer of the stator $p$, the form of contactors, for example of the cam-operated type, grouped so as to form a compact and readily accessible controller, ensuring all the operations in the order described above. This controller can also include in the case of traction a reverser $I_m$ adapted to change the running direction of the load motor or motors $m$.

In order to form this controller, it is possible, as mentioned above, to give to the contacts of the rheostat $R_h$, switches $i$, $i_1$, $i_2$, reverser I and stator pole-changer switch the form of contactors, these being conveniently operated by a common cam-shaft.

The arrangement and the external connections of such a controller are represented diagrammatically in Fig. 2. It comprises a cam-shaft $a$ which is driven step-by-step by a pilot motor $pm$, as well as several groups of cam switches which are represented by blocks $R_1$, $R_2$, $R_3$, $R_4$.

The first switch group, designated $R_1$, is arranged and connected in known manner so as to short-circuit or to put into circuit the slip rheostat $R_h$ which is connected to the rings $b$ of the machine M, Fig. 1. This switch group $R_1$ may consist for example of two three-pole cam contactors.

The second group $R_2$ of cam contactors corresponds to the reverser I, formed by two two-pole contactors, and to the switch $i_1$ of Fig. 1, formed by one contactor; this group likewise comprises a suitable number of contactors designated by $p_c$, used instead of the pole-changer switch, of Fig. 1, and connected in the well-known manner so as to change the number of poles of the stator windings $d_1$ and $d_2$ of the machine M, each of which is divided into two parts, as shown.

The third group $R_3$ of cam contactors corresponds to the switches $i$ and $i_2$ of Fig. 1; it is formed by one two-pole contactor and one single-pole contactor.

The fourth group $R_4$ connected to the rings $B_1$ of the machine C, comprises one three-pole contactor corresponding to the switch $i_3$ of Fig. 1; in addition, it comprises contactors $q$ used instead of the pole-changer of Fig. 1 for changing the pole numbers of the motors $m_1$, $m_2$, $m_3$, etc., which are for example traction motors of an electric locomotive, of the single or double squirrel-cage type, according to the characteristics required.

The change of the pole-number of these motors by the contactors $q$ is effected in the well-known manner by sub-division of each stator phase of the motors $m_1$, $m_2$, $m_3$, etc.; in order to simplify the diagram, the connections between the respective motors and the contactors $q$ have been represented by cables $g_1$, $g_2$, $g_3$, $g_4$, $g_5$, $g_6$, without indicating in detail the inter-connections, which are of customary type. It will be assumed that these connections are analogous with those of the windings $d_1$ and $d_2$.

If, for example, the contactors $q$ allow the motors $m_1$, $m_2$, etc. to be operated with four poles instead of eight, there will be provided two fresh economical speeds, that is to say without insertion of resistances, these speeds being equal to 150% and to 200% of the normal speed, and being intended for example to be used for express trains. Other relations of pole-numbers can provide other ranges of speeds.

By interconnecting the various groups of contactors as represented in Fig. 2, and by operating the pilot motor $p_m$ step-by-step, there will be effected in the desired order all the operations described above for obtaining the change of the frequency $f_2$.

In order to change the direction of rotation of the motors $m_1$, $m_2$, $m_3$, etc., there may be provided a conventional reverser $I_m$, as shown, connected between the rings $B_1$ and the contactor $i_3$. This reverser may be operated, and any one of the traction motors put out of service in case of damage, by means of a separate controller (not shown) of a well-known type.

As has been stated above, the change from one frequency $f_2$ to another is generally effected with a short interruption of the feed to the motor M. In the particular case of locomotives, these interruptions of the driving torque may be inconvenient; they can be avoided by providing two similar frequency converter sets, in conformity with the above description, each set energizing separately a group of traction motors.

The second convertor set, which is partially shown in Fig. 2, in thinner lines on the right, comprises four similar contactor groups, of which only two groups are seen; the group $R'_4$ can be connected by cables $g_4$, $g_5$, $g_6$ to the traction motors $m_4$, $m_5$ and $m_6$. The transitions from one speed to another in the two frequency convertor sets will not be made simultaneously, but successively, each of the pilot motors $pm$ and $pm'$ being for instance controlled in turn by a double master switch K, or like conventional means providing a non-simultaneous operation of the pilot motors. Thereby each set is overloaded for a very short time corresponding to the transition of the other, and during this time, this overloaded set will ensure the continuity of the traction effort.

The two convertor sets are thus completely independent and separate, each feeding one half of the motors on the locomotive, the first set feeding the motors $m_1$, $m_2$, $m_3$, and the second the motors $m_4$, $m_5$, $m_6$; the number of these convertor sets may be greater than two, their transitions then being effected in sequence.

Instead of having two complete frequency convertor sets, there may be provided a single frequency changer associated with two similar driving motors of the type described above, operating simultaneously and energized in parallel between the single-phase supply line and the ground. Such an arrangement is shown in Fig. 3, wherein $s$ represents the stator windings of the single frequency changer, and $p$ and $p'$ the respective stator windings of the two driving motors, which have separate speed controllers. The first controller comprises the elements $R_1$, $R_2$, $R_3$ and $R_4$, similar to the correspondingly designated elements of Fig. 2; the second controller has similar elements $R'_1$, $R'_2$ and $R'_3$, but need have no element $R'_4$ corresponding to the element $R_4$, if all the traction motors $m_1$, $m_2$, etc. are connected to the element $R_4$ of the first controller.

The speed-changing transition can for example be first effected upon the second driving motor by operating the pilot-motor $pm'$ by means of the master switch K. During this short transitional interruption of the second driving motor, the first motor is overloaded to deliver the full power required, but it will be understood that the traction motors $m_1$, $m_2$, etc. are thereby kept running without interruption. Afterwards, the first pilot-motor $pm$ will be operated in a similar way by the master switch K to change over the speed of the first driving motor, the full power required being delivered by the second driving motor during this transition.

What we claim is:

1. In a single-phase polyphase frequency convertor set for energizing a load circuit with polyphase current of variable frequency, comprising a single phase supply source, a multiple-speed polyphase driving machine of the wound-rotor induction type, mechanically coupled to a frequency-changer having a polyphase stator connected to said single-phase source, a main rotor with output slip-rings connected to said load circuit and a conventional intermediate rotor adapted for inducing polyphase currents in said frequency changer, output frequency control means comprising a slip rheostat connected to the rotor of said driving machine, switching means for short-circuiting gradually said slip rheostat, a switch interconnecting partially the phases of the respective stators of said driving machine and said frequency-changer in order to complete the polyphase energization of said driving machine, a switch controlling the polyphase stator current energizing said driving machine, a source of direct current, switching means connected for energizing the stator of said driving machine by said source of direct current instead of by said polyphase current in order substantially to immobilize said driving machine, with a plurality of switches interconnected to form a conventional reverser and a conventional pole-changing device, both connected to the stator of said driving machine, means mechanically interlinked and interconnected with all said output frequency control means to operate in a definite order to modify the speed of said driving machine step by step in both directions by combined action of said slip rheostat, said polyphase and direct-current energizing means, said reverser and said pole-changing device, in combination with a polyphase switch and a load reverser interposed between said output slip-rings upon the frequency-changer and said load circuit.

2. In a single-phase polyphase frequency convertor set for energizing a load at variable frequency, comprising a single-phase supply source, a multiple-speed driving motor of the wound-rotor induction type with a pole-changing device, said driving motor being mechanically coupled to a conventional frequency-changer having a polyphase stator connected to said single-phase source, a main rotor with output slip-rings connected to said load, and an idle intermediate rotor adapted for producing in a known manner a rotating field, output frequency control means comprising an adjustable slip rheostat connected to the rotor of said driving motor, switching means for short-circuiting gradually said rheostat, a switch interconnecting one phase of the stator of said driving motor and a stator phase of said frequency changer, a switch controlling the polyphase current energizing the stator of said driving motor, a source of direct current, switching means connected for energizing said driving motor by said source of direct current instead of by said polyphase current in order substantialy to immobilize said driving motor, with a plurality of switches forming a conventional reverser and a conventional pole-changing device, both connected to the stator of said driving motor, means mechanically interlinked, interconnected and grouped with all said output frequency control means to form a speed controller for said driving motor, said controller being rotatable step by step in both directions, interconnected with said slip rheostat and including said polyphase and direct-current energizing switches, said reverser and the pole-changing device of said driving motor, with a polyphase switch and a reverser interposed between said output slip-rings upon the frequency changer and said load.

3. Frequency control means according to claim 2, in which the reverser of the driving motor, the means for short-circuiting the slip rheostat, the pole-changing devices and all other switches mentioned are formed by cam-operated contactors grouped to form a controller driven by a pilot motor to effect all frequency control operations in a suitable order.

4. A system for controlling the output frequency of convertor sets according to claim 2 in order to energize continuously traction motors upon a vehicle, wherein said vehicle comprises a plurality of said rotary convertors, each separately coupled to a part of said traction motors, a separate driving motor with a corresponding speed controller for each of said rotary convertors, each of said speed controllers comprising means interlinked and interconnected with the output frequency control means of the corresponding convertor set, and means for operating said controllers otherwise than simultaneously in order to maintain the tractive effort of said vehicle during the transitions of said driving motors from one speed to another, said means comprising separate pilot-motors of the step-by-step type connected and coupled for operating said controllers and a selective master switch connected to said pilot-motors.

5. A system for controlling the output frequency of a convertor set according to claim 2 in order to energize continuously a plurality of traction motors upon a vehicle, wherein said vehicle comprises a convertor set formed by a frequency changer and two similar driving motors normally connected in parallel for simultaneous operation, each of said motors normally delivering approximately one half of the driving power for said frequency changer but being capable of developing the full power during a speed-changing operation upon the other motor, separate speed controllers interconnected with said driving motors, one of said speed controllers including pole-changing and reversing means for said traction motors, separate pilot-motors connected and coupled for operating said controllers otherwise than simultaneously in order to maintain the tractive effort of said vehicle, and a selective master switch connected to said pilot-motors.

References Cited in the file of this patent

UNITED STATES PATENTS

| Number | Name | Date |
|---|---|---|
| 730,673 | Lunt | June 9, 1903 |
| 1,098,345 | Durtnall | May 26, 1914 |
| 1,486,929 | Slepian | May 18, 1924 |
| 1,587,430 | Seiz | June 1, 1926 |
| 1,742,980 | Weiler | Jan. 7, 1930 |
| 1,997,464 | Krebs | Apr. 9, 1935 |
| 2,186,225 | Wrathall | Jan. 9, 1940 |
| 2,585,392 | Letrilliart et al. | Feb. 12, 1952 |

FOREIGN PATENTS

| Number | Country | Date |
|---|---|---|
| 619,612 | Great Britain | Mar. 11, 1949 |